March 12, 1935.  F. JERMÁŘ  1,994,314
HYDROSTATIC WEIR
Filed July 25, 1934
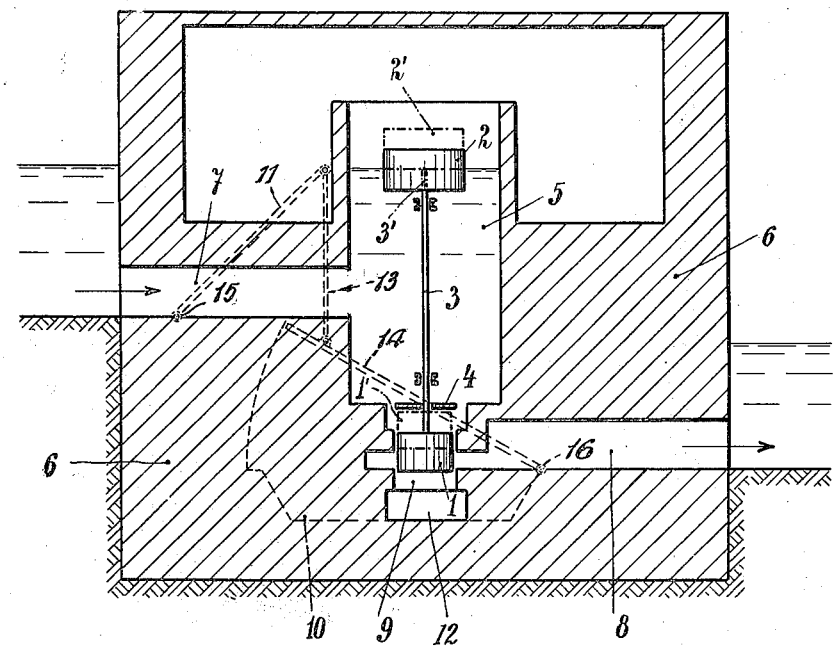
Inventor:
František Jermář

Patented Mar. 12, 1935

1,994,314

UNITED STATES PATENT OFFICE 1,994,314

HYDROSTATIC WEIR

František Jermář, Opava, Czechoslovakia

Application July 25, 1934, Serial No. 736,926
In Czechoslovakia May 30, 1934

2 Claims. (Cl. 61—23)

This invention relates to a hydrostatic weir of the kind wherein the weir shutter is maintained in raised position by water in a pressure chamber communicating for this purpose with the head water, and its object is to provide simple and efficient means for an automatic regulation of the head water level.

With this object in view the invention consists in the provision of a float chamber arranged above a valve chamber through which and through the float chamber the pressure chamber communicates with the head water, a float in said float chamber being connected to a valve in the valve chamber for controlling its communication with a conduit leading to the tail water, so that water will be automatically discharged through said conduit from the pressure chamber on a rise in the head water level.

The valve has the form of an open ended cylinder forming a sliding fit with the valve chamber and moves across the port leading to the discharge conduit, and a stationary member arranged above the valve, is adapted to co-operate with the latter for closing the communication between the float chamber and the pressure chamber on an excessive rise in the head water level.

The invention is illustrated in the accompanying drawing which represents a sectional view of the shore structure containing the float and valve chambers.

The weir comprises a shutter 11 which is pivoted at 15 to the sill of the weir and which is supported by struts 13 on a flap 14. The latter moves about hinges 16 and forms a yieldable cover for the pressure chamber 10 situated below the level of the sill. The pressure chamber communicates through a passage 12 with a cylindrical valve chamber 9 located in the shore structure 6 below a float chamber 5 which rises above the water level. The float chamber communicates with the valve chamber and also, through a conduit 7, with the head water which is thus free to enter the pressure chamber for maintaining the flap 14 and the weir shutter 11 in raised position. Another conduit 8, which communicates with the tail water, opens laterally into the valve chamber 9. The communication of the latter with the conduit 8 is controlled by a valve 1 in the form of an open ended cylinder which makes a sliding fit with the chamber and which is connected by means of a rod 3 to a float 2 in the float chamber, so that the position of the valve relative to the conduit 8 will be dependent on the head water level.

Normally the valve 1 occupies the position shown by full lines in the drawing; the conduit 8 is closed by the valve; and the pressure chamber 10 communicates through the valve and through the float chamber 5 with the head water, so that the shutter 11 will be supported in its predetermined position. If the head water should rise above the predetermined level, the water in the float chamber will rise to correspond, and the float 2 will lift the valve 1 so as to open the communication between the valve chamber and the conduit 8. Water will then be discharged through the conduit from the pressure chamber 10, and the weir shutter 11 will be lowered for increasing the flow of water over the weir. When the water level sinks, the valve will be lowered, and normal conditions will be restored.

A stationary member 4 is arranged above the valve 1 in the upper part of the valve chamber as an abutment for the valve. If the head water should rise sufficiently to bring the movable elements into the dotted positions 1', 2', and 3', the member 4 will close the valve cylinder and interrupt the communication through the valve of the pressure chamber 10 with the head water. Since the conduit 8 will at the same time be fully open, the water in the pressure chamber can be completely discharged and the weir shutter completely lowered.

I claim:

1. A hydrostatic weir of the character described, comprising a horizontally hinged weir shutter, a pressure chamber located below said shutter, a horizontally hinged flap forming a yieldable cover for said pressure chamber, struts whereby the weir shutter is supported on said flap, an automatic controlling device comprising a float chamber rising above the level of the head water, a conduit communicating with the head water and opening laterally into said float chamber, a cylindrical valve chamber arranged under the float chamber and communicating therewith as well as with the pressure chamber, a conduit communicating with the tail water and opening laterally into said valve chamber, a valve in the form of an open ended cylinder snugly guided in said valve chamber for controlling the communication through the valve chamber of the pressure chamber with the tail water, and a float in the float chamber connected to said valve for making the opening thereof dependent on a rise of the head water level.

2. The structure claimed in claim 1 the combination with a stationary member arranged above the valve as an abutment therefor and adapted to co-operate therewith for closing the communication of the valve chamber with the float chamber on an excessive rise of the head water level.

FRANTIŠEK JERMÁŘ.